Feb. 13, 1945.   A. V. MOTSINGER   2,369,170
OUTLET VALVE
Filed March 6, 1942
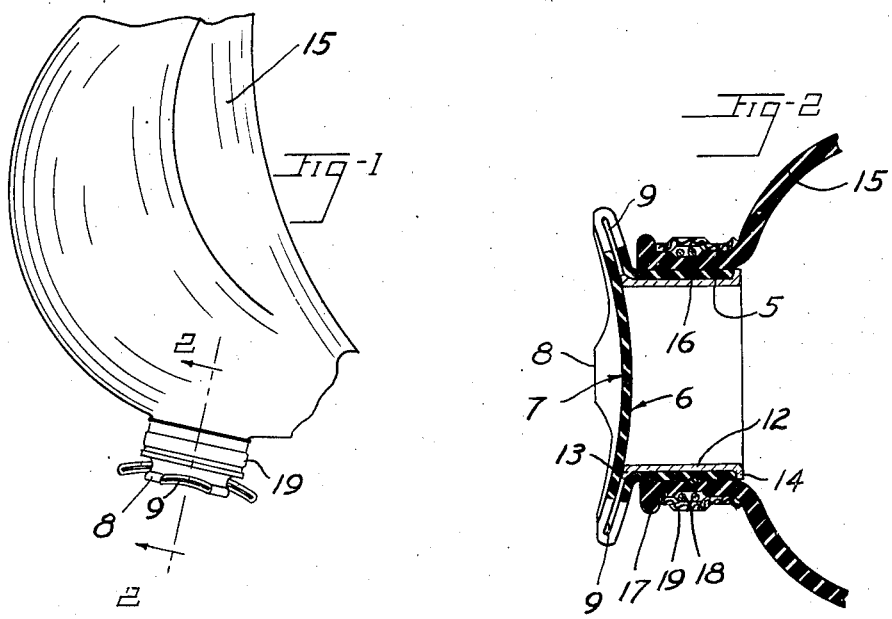
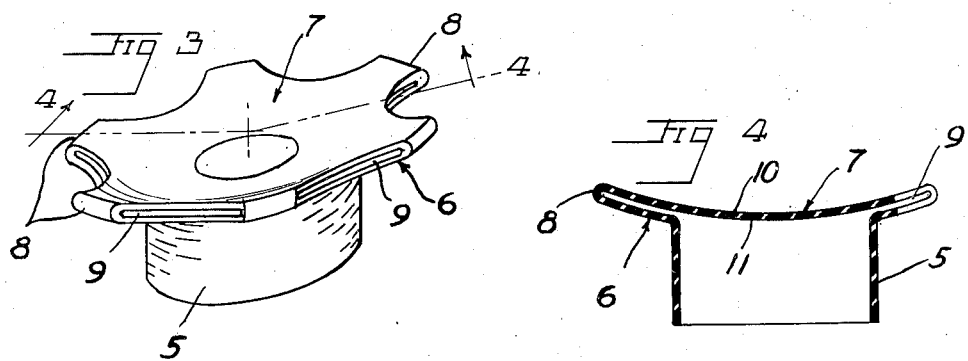
Inventor
Armand V. Motsinger
By Millard F. Cooke
Attorney Patented Feb. 13, 1945

2,369,170

UNITED STATES PATENT OFFICE 2,369,170

OUTLET VALVE

Armand V. Motsinger, Aberdeen, Md.

Application March 6, 1942, Serial No. 433,551

1 Claim. (Cl. 251—119)

(Granted under the act of March 3, 1883, as amended April 30, 1928; 370 O. G. 757)

The invention described herein may be manufactured and used by or for the Government for governmental purposes, without the payment to me of any royalty thereon.

This invention relates, in general, to valves. More particularly the invention is concerned with "one way" valves of the type advantageously employed in gas masks for the discharge of exhaled air therefrom, although not restricted to such field of use.

The valve of the present invention is an improvement over such exhalation valves as are now known and used for respirators and gas masks, and, while not limited in its application to gas masks for animals, is designed and constructed primarily for use therewith.

War experience has indicated that in spite of the undoubted efficiency of modern automotive equipment, there are conditions in conflict under which such equipment cannot operate and animal drawn and pack transportation, along with horse cavalry, point to a proper and advantageous solution of the problem arising under such conditions. Animals are susceptible to war gases, and, hence, protective equipment in the form of gas masks and the like is resorted to upon exposure, or probable exposure, of the animal to such gases.

As regards the exhalation valve, practically all the desirable qualities of such a valve for use on gas masks designed for wear by man must be embodied in the exhalation valve associated with the horse gas mask if the vigor of the horse is to be maintained during exposure.

It is, therefore, the broad aim of this invention to provide an exhalation valve for gas masks, whether of the type designed for wear by man or of the type designed for wear by horses, that will meet all the exacting requirements of such a valve, and is free of those objections hereinafter noted against the various types of valves heretofore available.

Various types of exhalation valves for the purpose indicated have been proposed or used, but all of them have been found objectionable for any one or more of a variety of reasons. In general, high resistance to air flow, or, in other words, high breathing resistance; faulty seating, either initially or in the course of time, resulting in leakage; and complexity of structure and assembly, precluding mass production, are some of the major drawbacks militating against the various types of prior exhalation valves.

A specific object of this invention is to improve upon the several parts of the valve in such a manner that they combine to present an efficient exhalation valve characterized by its initial low breathing resistance and full seating tendency, and its ability to retain such low breathing resistance and seating qualities over an extended period of use.

Another object of the invention is the provision of a valve marked by simplicity of construction, assembly facilitation, durability, reliability in use, and which, at the same time, is capable of being produced in quantity, and employed with equal advantage either on a gas mask or respirator to be worn by man, or on a horse gas mask.

The features of the invention, combining to present an exhalation valve having all the qualities above enumerated as desirable in a valve of this type and capable of attaining the stated objects of the invention, will be better understood and appreciated from a study of the following description made in connection with the accompanying drawing, wherein—

Figure 1 shows in side elevation and fragmentarily a portion of the muzzle piece of a horse gas mask, and illustrating the application of an exhalation valve, embodying the features of this invention, thereto:

Figure 2 is a detail section taken substantially on line 2—2 of Figure 1:

Figure 3 is a perspective view of the valve, per se. with the ferrule omitted; and, Figure 4 is a vertical secton taken substantially on line 4—4 of Figure 3.

In the embodiment illustrated, the valve of this invention consists essentially of a unitary structure embodying a neck 5, having at one end thereof a disc assembly composed of discs 6 and 7.

The discs 6, 7, at the peripheries thereof, and at predetermined intervals, are mutually united as at 8. Intermediate the spaced points of union 8 the edges of the discs are mutually free and coact to provide a series of exhaust ports or openings 9, controlled by the responsive action of the discs to the pressure of air against the disc 7.

In the light of the foregoing, it will be readily apparent that if the pressure of atmospheric air or gas on the concave surface 10 of disc 7 is greater than, for example, the pressure of air of exhalation on the convex surface 11 of disc 7 the valve will close and no noxious air or gas will pass therethrough. On the other hand, when the pressure of the exhaled air on surface 11 is greater than atmospheric pressure on surface 10 valve disc 7 will flex outwardly thus permitting the escape of expired air through the ports 9.

To implement the good seating and sealing qualities of the valve structure thus far described resort is advantageously had to a metal ferrule 12. The length of ferrule 12 is so proportioned to the length of valve neck 5 that the inward end 13 thereof just contacts the disc 7 when the valve is closed, and the outwardly directed terminal flange 14 just intimately seats against the free terminal edge of the neck 5, as illustrated to advantage in Figure 2.

A salient feature of this invention is the shape of discs 6, 7. As shown they are, respectively, concavo-convex, and thus nest, the latter into the former, to assure such contact therebetween as makes for effective closing of the valve and positive safeguard against leakage around the valve. Additionally, by reason of the extent of concavity, contemplated by this invention, of the discs and the consequent contact between the convex surface 11 of disc 7 and the seat-forming surface of ferrule 12 at terminal 13 thereof, the normal tendency of the valve to close and when closed to maintain a seal, is materially implemented.

In connection with the shape of the discs 6, 7 it is to be distinctly understood that the shape herein illustrated and before referred to is by way of example and is not to be considered restrictive. For example, instead of having disc 7 conforming to the surface of a sphere, or in other words concavo-convex, the disc may be fabricated so as to have a shape conforming substantially to the surface of a cone. As regard the shape of disc 7 there is however one very important consideration, namely, that the extent and depth of the cavity be proportioned to the overall maximum diameter of the disc. Here it may be observed and noted that to obtain the stated objects and advantages of this invention the disc 7 must be of such shape and of such material that it will at all times have an inherent tendency to assume and maintain a concave or conical shape. By reason of such inherent tendency on the part of the disc the same locks itself in seating engagement with the complementarily shaped disc 6 and seat-edge 13 of ferrule 12 and provides a tight seal. It should be further noted that the disc 7 is made from rubber or other flexible and elastic material, and that elastic tension exerted centrally on the disc by reason of the concavity therein is such as to hold the disc in line contact with edge 13 of ferrule 12 but with a substantial centre portion of disc 7 exposed to pressure and suction exerted thereon so that the disc will operate easily in response to any such pressure and/or suction. Such advantageous operation and efficient sealing are not available where, for example, a relative flat disc is used in the place and stead of a disc 7 having the features of advantage just enumerated.

The exhalation valve is affixed to the face piece of the gas mask, or in the case of a horse gas mask, to the muzzle piece thereof.

By way of illustration and not by way of restriction, the valve is herein shown and described as applied to the muzzle piece 15, depicted fragmentarily, of a horse gas mask in the following manner:

In attaching the valve to the muzzle piece the ferrule 12 is inserted in the valve neck 5 until flange 14 abuts the free end edge of the valve neck. A wire strand 16 of suitable length and gauge is then given a turn around the neck 5 and its ends tightly twisted together to contract the neck 5 about the ferrule.

After applying a coat of rubber cement to the exterior surface of neck 5 and to the interior surface of the usually provided tubular outlet 17 of the muzzle piece and prior to the drying of such coating the ferrule-lined valve neck 5 is positioned within the outlet 16.

Next, a strand of wire of suitable gauge is given several turns 18 about the outlet 17 and the ends of the wire than twisted together for securing the outlet 17 contracted about the neck 5, thus completing the securing of the exhalation or outlet valve in position on the gas mask. A band 19 of suitable and preferably elastic material is resorted to for concealing the wire 18, and gives to the mounting a complete, finished appearance.

In the drawing, and to the best advantage in Figure 2, the valve is shown in normally closed position under atmospheric pressure. Under pressure of exhalation disc 7 flexes outwardly out of contact with the seat-edge 13 of ferrule 12, permitting the expired air to escape through the ports 9, the latter opening in response to such outward flexing of disc 7 and to an extent proportionate to the extent of pressure of exhalation on the valve disc. In the intervals of exhalation the diaphragm or valve disc 7 flexes out of seating engagement with the metal seat 13 easily and with little resistance to breathing. The normal tendency of the diaphragm or valve disc to cup or flex inward to a concavity-forming condition implements the suction influence occurring in the inhalation intervals to assure an unfiltered air-excluding seal being formed upon seating contact of the disc with seat-forming edge 13. Here it may be noted that the mentioned tendency to cup or form a cavity only implements and in no wise relies or depends on the influence of suction to form between disc 7 and seat 13 the desired continuous air-excluding seal when the valve is closed.

In addition to the indicated desirable features characterizing the operation of the valve of this invention, the valve possesses features that enhance its value as regards quantity production. As previously explained, the desired air seal results, in accordance with this invention, from contact of the disc 7 with the edge 13 of ferrule 12, and any such seal resulting from contact of disc 7 with disc 6 is only incidental as such disc to disc contact will be because of unexpected pressure on the surface 10 of disc 7 or possibly because of excessive suction of inhalation. From the standpoint of manufacture, this is advantageous since it permits manufacture of the valve of this invention by molding the concavo-convex diaphragm or valve disc 7 a substantial distance from the concavo-convex disc 6. As a consequence of such molding a strong steel core may be used in the mold instead of a core made of metal foil or "Cellophane," as used in molds for the manufacture of valves of this general type but which, for the obtaining of the desired air seal, require the seal-forming parts of the valve being molded close together. The molding of the indicated parts of the valve in the manner to which this invention lends itself assures greater mass production in addition to enhancing the value of the valve as regards initial and continuing low breathing resistance and noxious air-excluding, seal-forming qualities, respectively, and adaptability to use in connection with either a horse gas mask or with the face pieces of gas masks particularly designed for wear by persons.

It will be understood that the invention is not limited to the precise embodiment herein illustrated and described. For example, at approximately the intervals 8 the discs 6 and 7 may be united by cementing the discs together, using heat and pressure to assure a substantial fusing of the parts. Also, as an alternate method of mounting the valve the ferrule 12 may be made integral with the angle tube on the face piece of the mask. Accordingly the invention is best defined in the following claim.

What is claimed as new is:

A valve comprising a one-piece elastic structure, consisting of a pair of normally nested concavo-convex discs integrally united at circumferentially spaced intervals but otherwise separated, one of said discs having a center portion provided with an opening and an integral neck aligned with said opening, and the other of said discs having a substantial portion exposed to fluid pressure in said neck; and a ferrule positioned in said neck and having an end edge forming the sole seat with which the second named disc normally engages in sealing contact, the center portion of the second named disc being normally projected, by reason of the inherent tendency of the disc to substantially cup, inwardly of said ferrule.

ARMAND V. MOTSINGER.